(12) United States Patent
Vuong

(10) Patent No.: US 8,751,967 B2
(45) Date of Patent: Jun. 10, 2014

(54) METHOD FOR SELECTING FILES ON A PORTABLE ELECTRONIC DEVICE

(75) Inventor: Thanh Vinh Vuong, Kitchener (CA)

(73) Assignee: BlackBerry Limited, Waterloo (CA)

( * ) Notice: Subject to any disclaimer, the term of this patent is extended or adjusted under 35 U.S.C. 154(b) by 147 days.

(21) Appl. No.: 12/968,359

(22) Filed: Dec. 15, 2010

(65) Prior Publication Data

US 2012/0159394 A1    Jun. 21, 2012

(51) Int. Cl.
*G06F 3/00* (2006.01)
*G06F 3/048* (2013.01)

(52) U.S. Cl.
USPC .......................... 715/833; 715/752; 715/821

(58) Field of Classification Search
USPC .......... 715/748–749, 751–752, 817, 821, 833
See application file for complete search history.

(56) References Cited

U.S. PATENT DOCUMENTS

| | | | | |
|---|---|---|---|---|
| 5,828,374 A * | 10/1998 | Coleman et al. | ............... | 715/786 |
| 5,850,531 A * | 12/1998 | Cox et al. | ....................... | 715/781 |
| 7,117,453 B2 * | 10/2006 | Drucker et al. | ............... | 715/833 |
| 7,424,686 B2 * | 9/2008 | Beam et al. | .................... | 715/810 |
| 7,797,643 B1 * | 9/2010 | Jobs et al. | ...................... | 715/815 |
| 8,078,985 B2 * | 12/2011 | Sauermann | .................... | 715/784 |
| 8,214,764 B2 * | 7/2012 | Gemmell et al. | ............. | 715/833 |
| 8,276,092 B1 * | 9/2012 | Narayanan et al. | ............ | 715/772 |
| 8,286,085 B1 * | 10/2012 | Denise | ........................... | 715/752 |
| 2007/0067272 A1 | 3/2007 | Flynt et al. | | |
| 2008/0040665 A1 * | 2/2008 | Waldeck | ....................... | 715/277 |
| 2008/0086451 A1 * | 4/2008 | Torres et al. | ....................... | 707/3 |
| 2010/0251165 A1 * | 9/2010 | Williams | ....................... | 715/784 |
| 2011/0246427 A1 * | 10/2011 | Modak et al. | ................. | 707/653 |
| 2012/0131507 A1 * | 5/2012 | Sparandara et al. | .......... | 715/833 |

FOREIGN PATENT DOCUMENTS

| | | |
|---|---|---|
| EP | 1672902 A2 | 6/2006 |
| WO | WO2006/077512 A1 | 7/2006 |
| WO | WO 2007/030396 A2 | 3/2007 |
| WO | WO 2009/124337 A1 | 10/2009 |

OTHER PUBLICATIONS

Koike Y et al: "Timeslider: an interface to specify time points", UIST'97. 10th Annual Symposium on user interface Software and Technology proceedings of the ACM Symposium on User interface Software and Technology. Banff, Alberta, Canada, Oct. 14-17, 1997.
Extended European Search Report—EP Application No. 10195094. 7—Jun. 1, 2011.
Tim Fidgeon, Innovative user interface design, http://www.uigarden. net/english/innovative-user-interface-design, Oct. 19, 2006.

(Continued)

*Primary Examiner* — Omar Abdul-Ali
*Assistant Examiner* — Andrew Tank
(74) *Attorney, Agent, or Firm* — Ridout & Maybee LLP

(57) ABSTRACT

A method of selecting files and a portable electronic device configured to perform the method are provided. In accordance with one embodiment, there is provided a method of selecting one or more files on a portable electronic device, comprising: displaying a file selection user interface screen on a display of the portable electronic device, the file selection user interface screen comprising a slider comprising a reference bar and an indicator moveable within the reference bar; selecting one or more files in accordance with a position of the indicator; and attaching the selected files to an electronic message.

25 Claims, 6 Drawing Sheets

(56) References Cited

OTHER PUBLICATIONS

Author Unknown, Printing your own pictures, http://www.microsoft.com/windowsxp/using/digitalphotography/learnmore/printphotos.mspx, Oct. 18, 2005.

Tony Northrup, Three ways to print pictures with Windows XP, http://www.microsoft.com/windowsxp/using/digitalphotography/learnmore/waystoprint.mspx, Jun. 20, 2005.

Author Unknown, How to Use File Choosers, http://download.oracle.com/javase/tutorial/uiswing/components/filechooser.html, Date Unknown.

Author Unknown, Amazon.com Loose Diamonds: Round Cut, Princess Cut, Diamond Engagement Rings & more, http://www.amazon.com/Loose%E2%80%90Diamonds%E2%80%90Diamond%E2%80%90Engagement%E2%80%90Rings/loosediamonds?_encoding=UTF8&productGroupID=loose_diamonds, date Unknown.

Author Unknown, Slider, http://ajaxpatterns.org/Slider, Date Unknown.

Author Unknown, Slider, http://ajaxpatterns.org/archive/Slider.php, Date Unknown.

Dave Taylor, Ask Dave Taylor: What's Yahoo Mindset?, http://www.askdavetaylor.com/whats_yahoo_mindset.html, 2005.

Author Unknown, eM@il Sender, http://www.apptism.com/apps/em-il-sender, Jul. 17, 2009.

Mark, Tutorial: Sending Attachments From Your Blackberry Device, http://www.berryreview.com/2008/04/09/tutorial-sending-attachments-from-your-blackberry-device/, Apr. 9, 2008.

Author Unknown, How to Add Multiple Attachments in Gmail, http://forums.techarena.in/tips-tweaks/1149149.htm, Mar. 27, 2009.

Marc Neuwirth, Using a jQuery UI Slider to Select a Time Range, http://blog.marcneuwirth.com/2010/02/21/using-a-jquery-ui-slider-to-select-a-time-range/, Feb. 21, 2010.

Tashfeen Ekram, Using Slider with Times, http://forum.jquery.com/topic/using-slider-with-times, Jan. 30, 2010.

Author Unknown, Attach more than photos to emails using Astrol, http://androidforums.com/android-applications/28962-attach-more-than-photos-emails-using-astro.html, Dec. 19, 2009.

Kanlis, Angelos—European Patent Office—"Communication Pursuant to Article 94(3) EPC" for European Patent Application No. 10195094.7 dated Jun. 20, 2013, Germany.

Linco, Reginald—Canadian Intellectual Property Office, "Examiner's Requisition" for Canadian Patent Application No. 2,760,198 dated Dec. 3, 2013.

* cited by examiner

METHOD FOR SELECTING FILES ON A PORTABLE ELECTRONIC DEVICE

TECHNICAL FIELD

The present disclosure relates to portable electronic devices, and in particular to a method of selecting files on a portable electronic device.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth™ capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed.

Selecting multiple documents using a graphical user interface (GUI) provided by a portable electronic device is a time consuming and cumbersome process. For example, if multiple files are to be attached to an electronic message, such as an email message, a user must individually select and attach each file to the electronic message. Accordingly, there remains a need for an improved method of selecting files for attachment to an electronic message.

DETAILED DESCRIPTION OF EXAMPLE EMBODIMENTS

Figure 1:
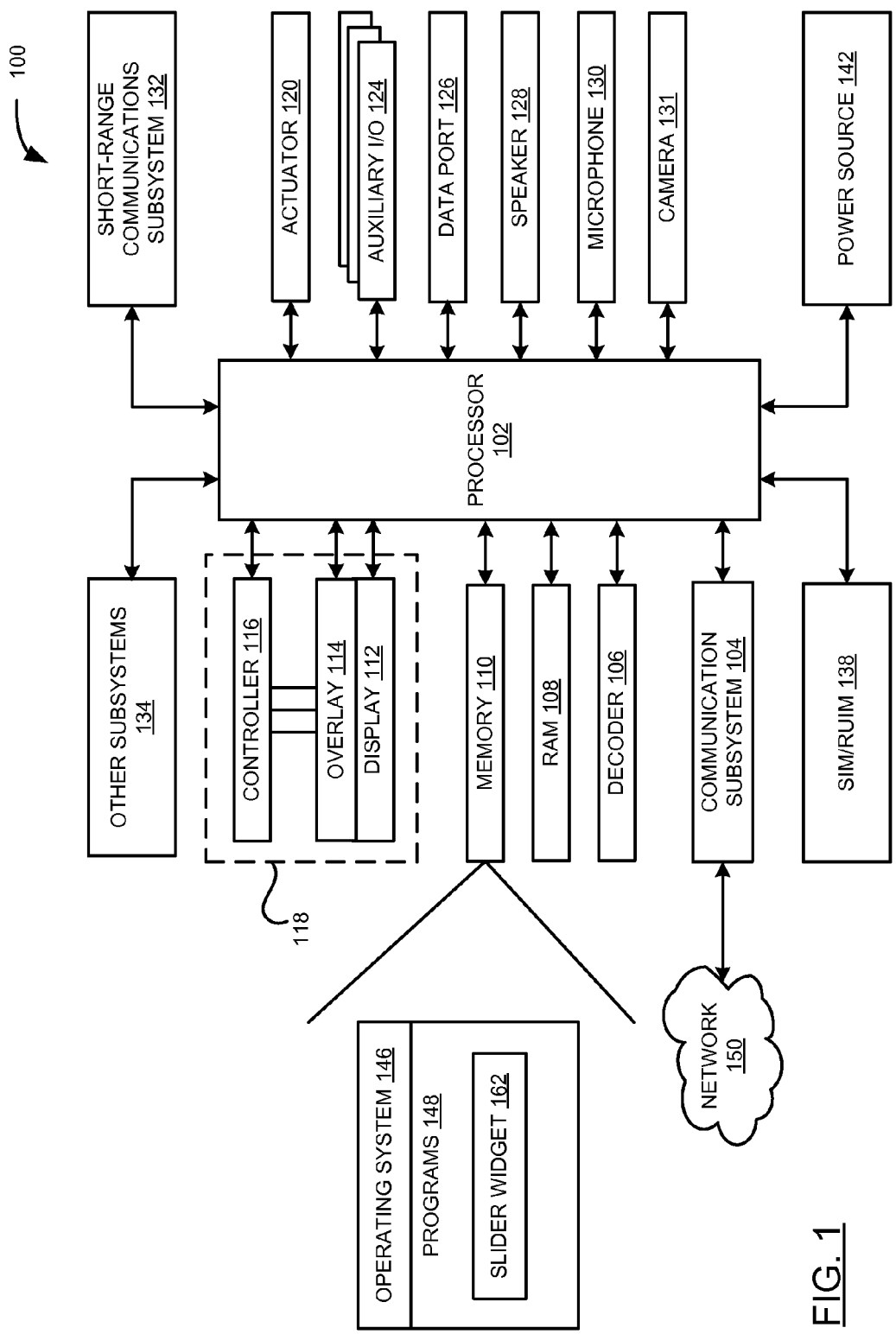
FIG. 1 is a simplified block diagram of components of a portable electronic device in accordance with one example embodiment of the present disclosure.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described.

The present disclosure provides a method of file selection which seeks to provide an easier and faster approach to attaching multiple files to an electronic message based on user-defined criteria. The method is particularly advantageous when attempting to select a small group of files from a larger group of files, such as when attempting to select a few digital pictures from hundreds or thousands of digital pictures stored on an electronic device. In one example embodiment, a slider user interface configured by one or more file parameters, such as file type and date, is used to select and display a list of files (such as digital picture files) to attach as an attachment to an electronic message. A user can then unselect files to remove the files from the list of files to attach as an attachment to an electronic message. Alternatively, unselected files may remain in the list of files while selected files are indicated using highlighting or other suitable method of visual indication.

In accordance with one embodiment of the present disclosure, there is provided a method of selecting one or more files on a portable electronic device, comprising: displaying a file selection user interface screen on a display of the portable electronic device, the file selection user interface screen comprising a slider comprising a reference bar and an indicator moveable within the reference bar; and selecting one or more files in accordance with a position of the indicator.

In accordance with another embodiment of the present disclosure there is provided a method of selecting files on a portable electronic device, comprising: displaying a file selection user interface screen on a display of the portable electronic device, the file selection user interface screen comprising a slider comprising a reference bar and an indicator moveable within the reference bar; selecting one or more files in accordance with a position of the indicator; and attaching the selected files to an electronic message.

In accordance with a further embodiment of the present disclosure, there is provided a portable electronic device comprising: a display and a processor coupled to the display, wherein the processor is configured for performing the methods described herein.

The present disclosure generally relates to electronic devices which may be a portable electronic device in some embodiments. Examples of portable electronic devices include handheld electronic devices, wireless electronic devices such as pagers, cellular phones, cellular smart-phones, wireless organizers, personal digital assistants, wirelessly enabled notebook computers, and so forth. The portable electronic device may also be a portable electronic device without wireless electronic capabilities, such as a handheld electronic gaming device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Electronic functions, including data and voice electronic, are performed through an electronic subsystem 104. Data received by the portable electronic device 100 is decompressed and decrypted by a decoder 106. The electronic subsystem 104 receives messages from and sends messages to a wireless network 150. The wireless network 150 may be any type of wireless network, including, but not limited to, data wireless networks, voice wireless networks, and networks that support both voice and data electronic. A power source 142, such as one or more rechargeable batteries or a port to an external power supply, powers the portable electronic device 100.

The processor 102 interacts with other components, such as Random Access Memory (RAM) 108, memory 110, a display 112 (such as a liquid crystal display (LCD)) with a touch-sensitive overlay 114 coupled to an electronic controller 116 that together comprise a touch-sensitive display 118, one or more actuators 120, one or more auxiliary input/output (I/O) subsystems 124, a data port 126, a speaker 128, a microphone 130, camera 131, short-range electronic subsystem 132, and other device subsystems 134. User-interaction with a graphical user interface (GUI) is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device 100, is displayed on the touch-sensitive display 118 via the processor 102.

To identify a subscriber for network access, the portable electronic device 100 uses a Subscriber Identity Module or a Removable User Identity Module (SIM/RUIM) card 138 for electronic with a network, such as the wireless network 150. Alternatively, user identification information may be programmed into memory 110.

The portable electronic device 100 includes an operating system 146 and software applications or programs 148 that are executed by the processor 102 and are typically stored in a persistent, updatable store such as the memory 110. Additional applications 148 may be loaded onto the portable electronic device 100 through the wireless network 150, the auxiliary I/O subsystem 124, the data port 126, the short-range electronic subsystem 132 or any other suitable subsystem 134. The applications 148 include a slider user interface application 162 which provides a slider user interface for selecting files. The slider user interface application 162 may be used for selecting files for attachment to an electronic message or possibly other uses. The slider user interface application 162 may be part of a particular application 148, such as an email messaging application or other messaging application, or an application programming interface (API) accessible by several different applications 148, which may include a number of messaging application and possibly other applications. The slider user interface provides a mechanism for automatically, or semi-automatically, selecting multiple files based on a number of selection criteria.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communication, the overall operation of the portable electronic device 100 is similar. The speaker 128 outputs audible information converted from electrical signals, and the microphone 130 converts audible information into electrical signals for processing.

Figure 2:
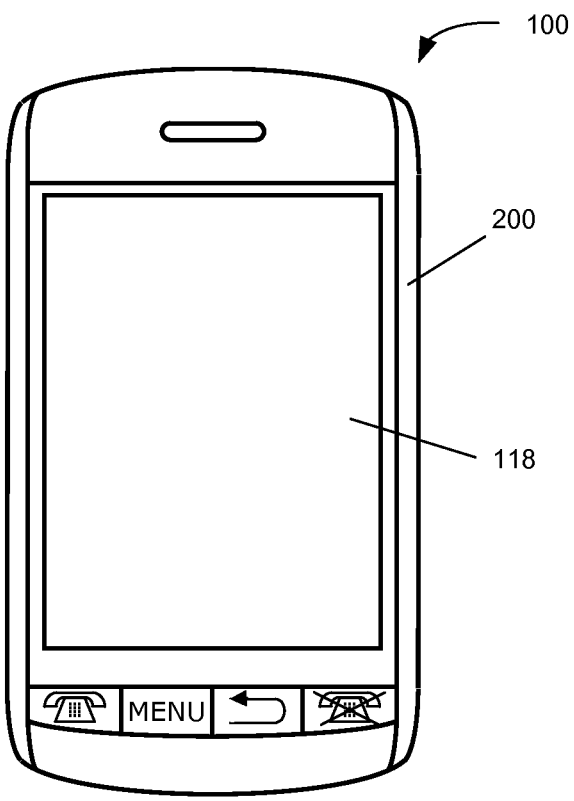
FIG. 2 is a front view of an example of a portable electronic device 100 in a portrait orientation.

FIG. 2 shows a front view of an example of a portable electronic device 100 in portrait orientation. The portable electronic device 100 includes a housing 200 that houses internal components including internal components shown in FIG. 1 and frames the touch-sensitive display 118 such that the touch-sensitive display 118 is exposed for user-interaction therewith when the portable electronic device 100 is in use. It will be appreciated that the touch-sensitive display 118 may include any suitable number of user-selectable features rendered thereon, for example, in the form of virtual buttons for user-selection of, for example, applications, options, or keys of a keyboard for user entry of data during operation of the portable electronic device 100.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a centre of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected. The centre of the area of contact of each touch is commonly referred to as the touch point or centroid. It will be appreciated that during a touch event the touch point moves as the object detected by the touch-sensitive display 118 moves.

The actuator(s) 120 may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 may result in provision of tactile feedback.

In yet other embodiments, a conventional display may be provided instead of the touch-sensitive display 118. In such embodiments, input may be provided via one or more control keys, a keyboard or keypad, navigation device or any combination thereof.

The auxiliary I/O subsystems 124 could include other input devices such as one or more control keys, a keyboard or keypad, navigational tool (input device), or both. The navigational tool may be a depressible (or clickable) joystick such as a depressible optical joystick, a depressible trackball, a depressible scroll wheel, or a depressible touch-sensitive trackpad or touchpad. The other input devices could be included in addition to, or instead of, the touch-sensitive display 118, depending on the embodiment.

The auxiliary I/O subsystems 124 may include a memory card reader for receiving and reading a removeable memory card including, but not limited to, a non-volatile memory card such as a Secure Digital (SD™) card or Secure Digital High Capacity (SDHC™) card. The removeable memory card may be used for auxiliary storage in addition to the memory 110 for storing, among other things, user data such as media files. The removeable memory card may store, for example, image files, audio files, video files or other media file. The image files, audio files and video files may be data recorded on the portable electronic device 100 using the microphone 130 and/or camera 131, depending on the type of media file.

Figure 3:
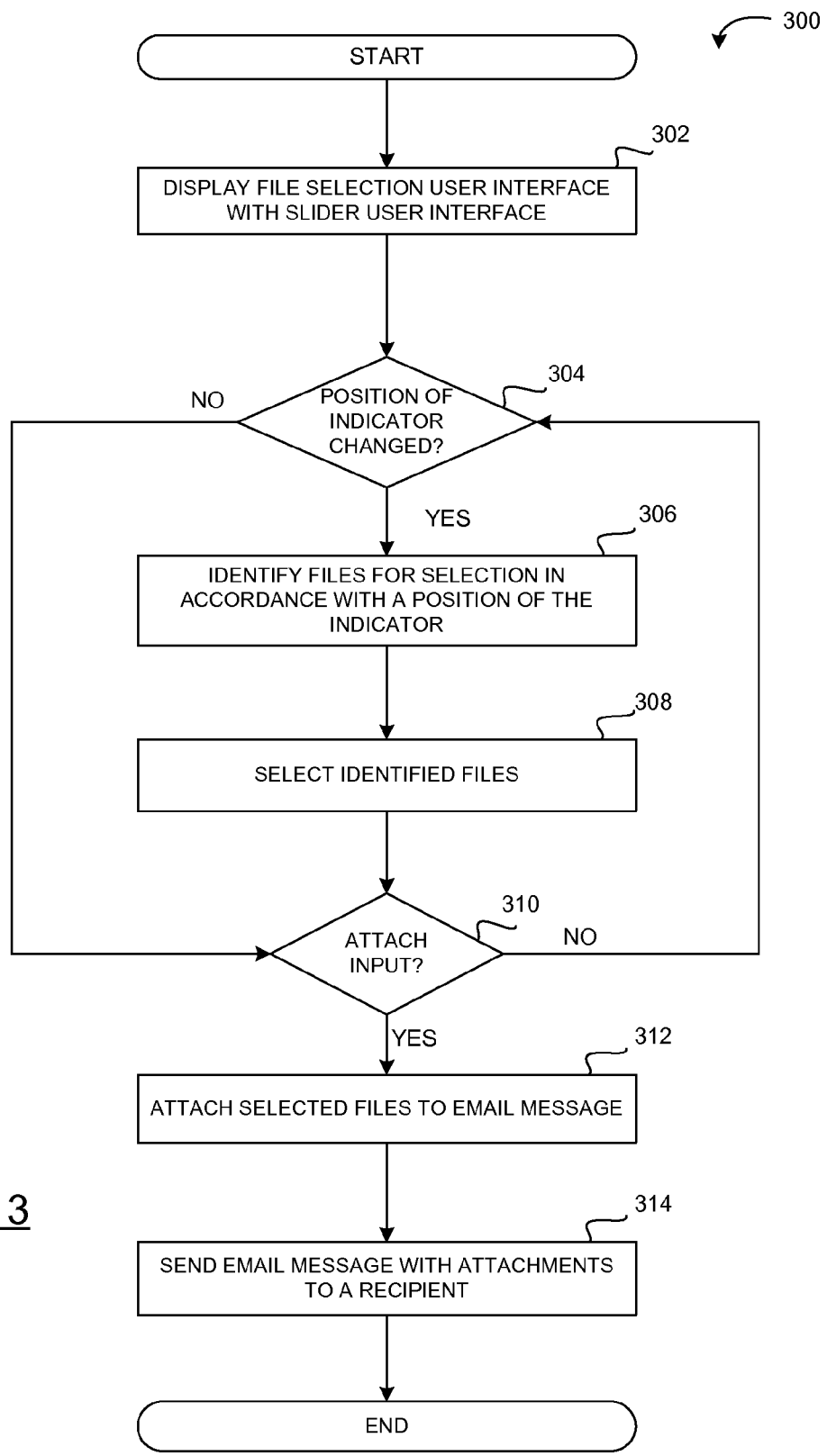
FIG. 3 is a flowchart illustrating a method of selecting files on a portable electronic device accordance with one example embodiment of the present disclosure.

A flowchart illustrating one example embodiment of a method 300 of selecting files on the portable electronic device 100 in accordance with one example embodiment of the present disclosure is shown in FIG. 3. The method 300 may be carried out by software such as the slider user interface application 162 executed, for example, by the processor 102. Coding of software for carrying out such a method 300 is within the scope of a person of ordinary skill in the art provided the present disclosure. The method 300 may contain additional or fewer processes than shown and/or described, and may be performed in a different order. Computer-readable code executable by the processor 102 to perform the method 300 may be stored in a computer-readable medium such as the memory 110. The method 300 in the described embodiment is implemented by an email messaging application for composing and sending email messages and is used for selecting one or more files for attachment to an email message.

In other embodiments, the method may be used by other messaging applications for composing and sending other types of electronic messages including, but not limited to, an SMS (Short Message Service) messaging application for composing and sending SMS text messages, a Multimedia Messaging Service (MMS) messaging application for composing and sending MMS text messages, an instant messaging (IM) application for composing and sending IM messages, a peer-to-peer or device-to-device messaging application for composing and sending peer-to-peer messages, or a personal information manager (PIM) capable of composing and sending a number of different types of electronic messages.

The portable electronic device 100 displays a file selection user interface comprising a file list including one or more selectable files and a slider user interface on the display 112 in response to received input (302). The file selection user interface is displayed or invoked by the email messaging application in response to the received input. The file selection user interface may be part of the messaging application or an APT, as described above. The received input may be input received by the portable electronic device 100 to add an attachment to an email message. The input may be a command or action to add an attachment to an email message already under composition in an email message composition user interface screen, for example, by selecting an "Add attachment" or similar command from a menu or selecting an appropriate onscreen button. Alternatively, the input may invoke the email message composition user interface screen to start the composition of a new email message.

The files in the file list are typically user data files which may be of any type including, but not limited to, electronic messages, notes, calendar items (which may be collectively referred to as PIM items), image files such as digital pictures, audio files such as songs, video files, applications, word processing documents, spreadsheet documents, PDF documents, etc. The files may be organized into databases each containing files of the same type, each associated with the same application 148, or both. Alternatively, the files may be stored in unorganized form. The files may be stored in the memory 110, in a memory card received in a memory card reader of the portable electronic device 100, or both.

Each of the files has one or more file parameters (sometimes referred to as metadata) associated with it which may include, but is not limited to, one or more of the following: Name, Size, Type, Date Modified, Date Created, Date Accessed, Location, Source, Attributes, Status, Owner, Author, Title, Subject, Category, Pages, Comments, Copyright, Artist, Album Title, Year, Track Number, Genre, Duration, Bit Rate, Protected, Camera Model, Date Picture Taken, Dimensions, Episode Name, Program Description, Audio sample size, Audio sample rate, Channels, Company, Description, File Version, Product Name, Product Version, and Keywords. The particular types and structure of the file parameters and the manner in which the file parameters are stored is not relevant to the present disclosure and so has not been described herein.

The file list may be a list of all files stored in the memory 110 and/or memory card (or other external electronic storage) of the portable electronic device 100, or a subset of those files. The file list may be displayed, for example, in the form of: (i) a simple list of file names, (ii) a detailed file list including the file name and at least some of the other file parameters of the respective files, (iii) thumbnails, (iv) icons, or (v) tiles. The simple list and detailed list may each include a pictorial representation of the type of file or associated application 148 along with the file parameters. The thumbnails, icons and tiles each include a pictorial representation of the type of file or associated application 148 and optionally a file name and/or other file parameters associated with the respective files. The file list is typically presented as a table of rows and columns with each row in the table representing a respective file. Columns in the table are used to show file parameters such as file names. A header with descriptive labels describing the file parameters in the columns may be provided in some embodiments. Other formats for presenting the file list are possible.

The file list may be sorted in accordance with the file parameters associated with the respective files, for example, by file name, size, type, date created, etc. When the entire file list does not fit on the display 112 of the portable electronic device 100, one or more scroll bars for navigating the file list may be provided. Typically, a vertical scroll bar is provided for navigation through the files in the file list when the entire file list does not fit on the display 112 (i.e., navigating the rows of the table). A horizontal scroll bar is typically provided for navigation through the file parameters associated with the respective files when the entire file list does not fit on the display 112 (i.e., navigating the columns of the table). The scroll bars allow navigation through the file list to browse through the files and the file parameters associated with the respective files.

The slider user interface is configured for selecting one or more files in the file list. As understood to persons skilled in the art, a slider user interface is a graphical widget provided by the GUI of the portable electronic device 100 for managing user configurable data or information, such as the files being selected for attachment to an email message. The widget displays data or information which is manageable or changeable by the user in a window or box presented by the GUI. The widget may provide a single interaction point for the manipulation of a particular type of data or information, such as the files being selected for attachment to an electronic message or other purpose. Typically, all applications 148 on the portable electronic device 100 which allow input or manipulation of the particular type of data or information invoke the same widget. For example, each application 148 which allows the user to select files for attachment to an electronic message may utilize a shared widget for file selection. Widgets are building blocks which, when called by an application 148 or the operating system 146, process and manage available interactions with the particular type of data or information.

The slider user interface, which is referred to in the following description as a slider, comprises a reference bar (also known as a slider bar) defining a range of values and a moveable or otherwise adjustable indicator having a position which corresponds to a value in the range of values defined by the reference bar, or subset of values in the range of values defined by the reference bar. The reference bar has a scale based on a particular type of file parameters (e.g., type, time, date, author, location). The range of values is bound by endpoint(s) which may be maximum and minimum values. The scale may be a linear scale (also known as a uniform scale) in which equal distances along the reference bar correspond to equal numerical values (e.g., time, date). For example, a time slider may be based on hours and have a 24-hour scale with 0 hours at one end and 24 hours at the opposite end, or could be based on increments of a several hours (e.g. 4 hours). Alternatively, the scale may be a non-linear scale or may be a set of numerical values or non-numerical values (e.g., type, location, author, etc.). The set may be ordered or non-ordered. For example, when the basis of the slider is time, the values of the slider could be the last 1, 3, 6, 12 hours etc. When the basis of the slider is date, the values of the slider could be the current day, yesterday, 2 days, 5 days, 7 days, last week, month, etc. When the basis of the slider is location, the value of the slider could be work, home, or specified locations defined by the user (e.g., Toronto, Niagara Falls, etc.). When the basis of the slider is source, the value of the slider could be local memory 110 or removeable memory (e.g., removeable memory card).

The reference bar may include lines located at various points along its length to indicate the possible positions of the indicator and/or text labels located at various points along its length to indicate a value or approximate value at different positions of the indicator. The slider may be oriented horizontally or vertically on the display 112. The lines and/or labels may be located at each of the possible positions of the indicator, or may be located at only a subset of the possible positions of the indicator.

The value of a slider defines a value or range of values for a particular file selection criterion for selecting files. The file selection criterion typically has the value or range of values which corresponds to the position of the indicator along the reference bar. However, the value or range of values may be defined by the position of the indicator and a position of one of the end points of the reference bar of the slider. For example, with a time slider divided into a number between 0 and 24 hours of increments of 4 hours, the value of the slider may be the range of 0 to 4 hours when the indicator is positioned at 4 hours.

A user or application 148 may set a value of a slider by (re)positioning the indicator. A user may set the value, for example, by selecting (e.g., touching or clicking) and moving the indicator (i.e., selecting and dragging the indicator) from an initial position to a new position using, for example, the touch-sensitive display 118 or navigational tool. Alternatively, a user may set the value by selecting a location on reference bar for example, the touch-sensitive display 118, button, or key in a keyboard or keypad. In some embodiments, selecting the reference bar at a location on either side of the indicator incrementally moves the indicator a predetermined amount in the relevant direction. This may be performed, for example, by touching the touch-sensitive display 118 at the appropriate location, or moving and clicking the navigational tool at the appropriate location.

The number of sliders available and the basis of the sliders may be configurable, for example, by a user. The basis for a slider could be based on any type of file parameter. The basis for evaluating a date slider may be set as the date created, date modified, date accessed or date picture taken. Similarly, the basis for a time slider may be set to as time created, date modified, date accessed or date picture taken.

In some embodiments, a slider user interface may be limited to controlling all documents of the same type (i.e., image files, document files, spreadsheet, etc.) and the scale of the slider is a time or date for selecting files of a particular type with a time or date with a value or within a range specified by the position of the indicator. When the indicator is positioned by the user, the portable electronic device 100 selects all files of the particular type (e.g., images) based on the position/value of the indicator (e.g., all images taken in last 1 hour). In some embodiments, the user may unselect any undesired files.

Multiple sliders may be provided for multiple file selection criteria with each slider being used to control the value of a particular file selection criterion. In one example embodiment, a first slider for a first file selection criterion and a second slider for a second file selection criterion are provided. The first file selection criterion may be file type and the second file selection criterion may be temporal characteristics, such as a date/time created or date/time last accessed/viewed. The second file selection criterion is applied only to files which match the first file selection criterion. When multiple sliders are provided, the sliders may be oriented horizontally or vertically on the display 112. Positioning the indicator allows files to be selected in accordance with a particular value or range of values of one or more particular file selection criterion or criteria. The file particular selection criterion or criteria may be fixed or configurable by the user.

When multiple sliders are used, the basis for a second or further slider may be based on the basis of the first slider and/or other previous sliders. Similarly, the basis for a second or further slider may be based on the value of the first slider and/or other previous sliders. For example, when the first slider is a file type slider set to JPEG and the second slider is a time slider, the basis for the time slider may be time picture taken or last time picture viewed, etc. Accordingly, the basis applied by multiple sliders may be interdependent.

In some embodiments, two indicators may be provided by a single slider to define a range within the values of the reference bar. The two indicators may be used to set a value of the slider to a range of values defined by the respective position of indicators. For example, a first indicator of a time slider may be located at 4 hours and the second indicator may be located at 12 hours to select files in the file list that were created, modified or viewed between the last 4 to 12 hours.

In some embodiments, the other selection means may be provided in addition to the sliders including, but not limited to, selection boxes or radio buttons which allow a user or application to select a particular file selection criterion that does not readily lend itself to a slider.

Figure 4A:
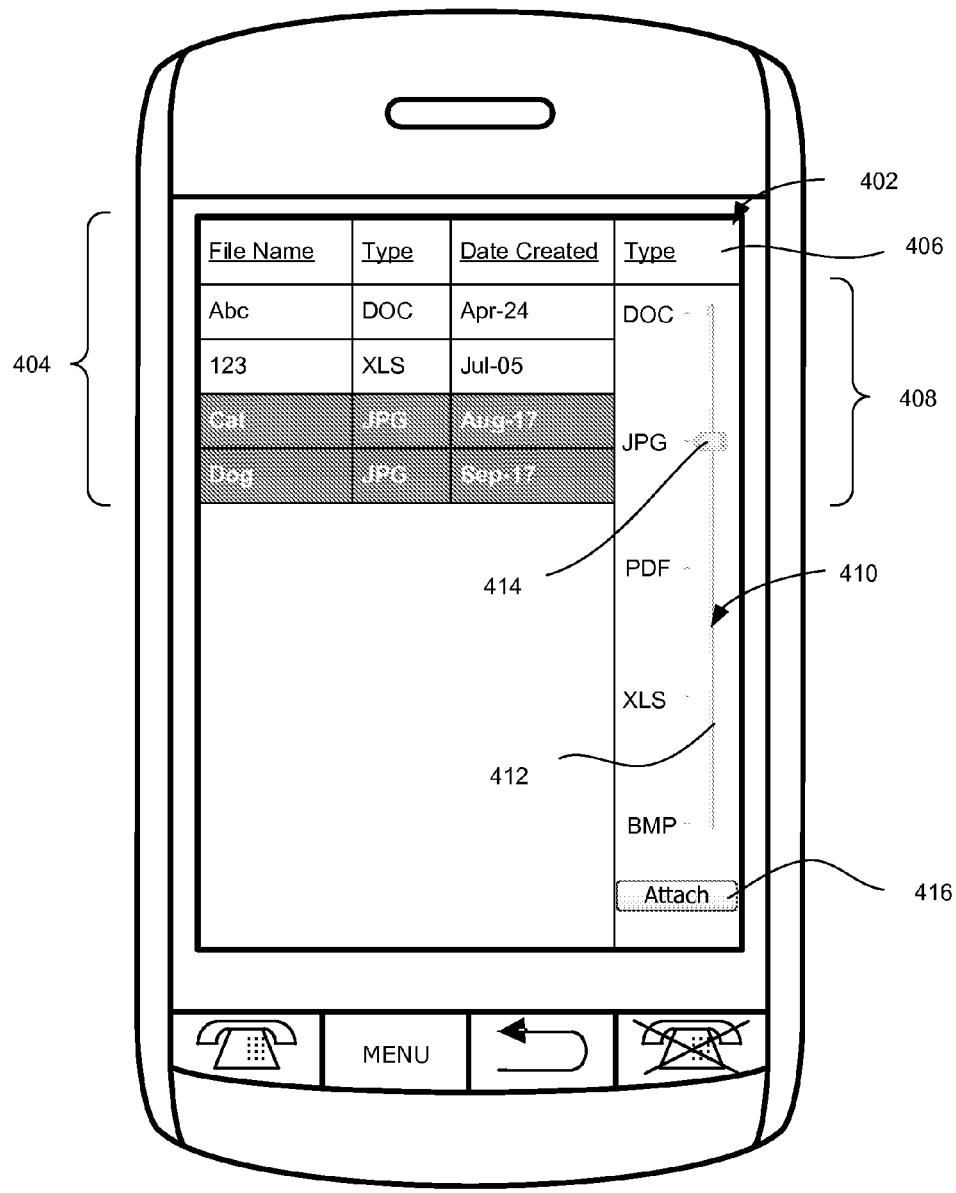
FIGS. 4A to 4C are front views of the portable electronic device of FIG. 2 displaying example file selection user interface screens including a slider user interface in accordance with an example embodiment of the present disclosure.
Figure 4B:
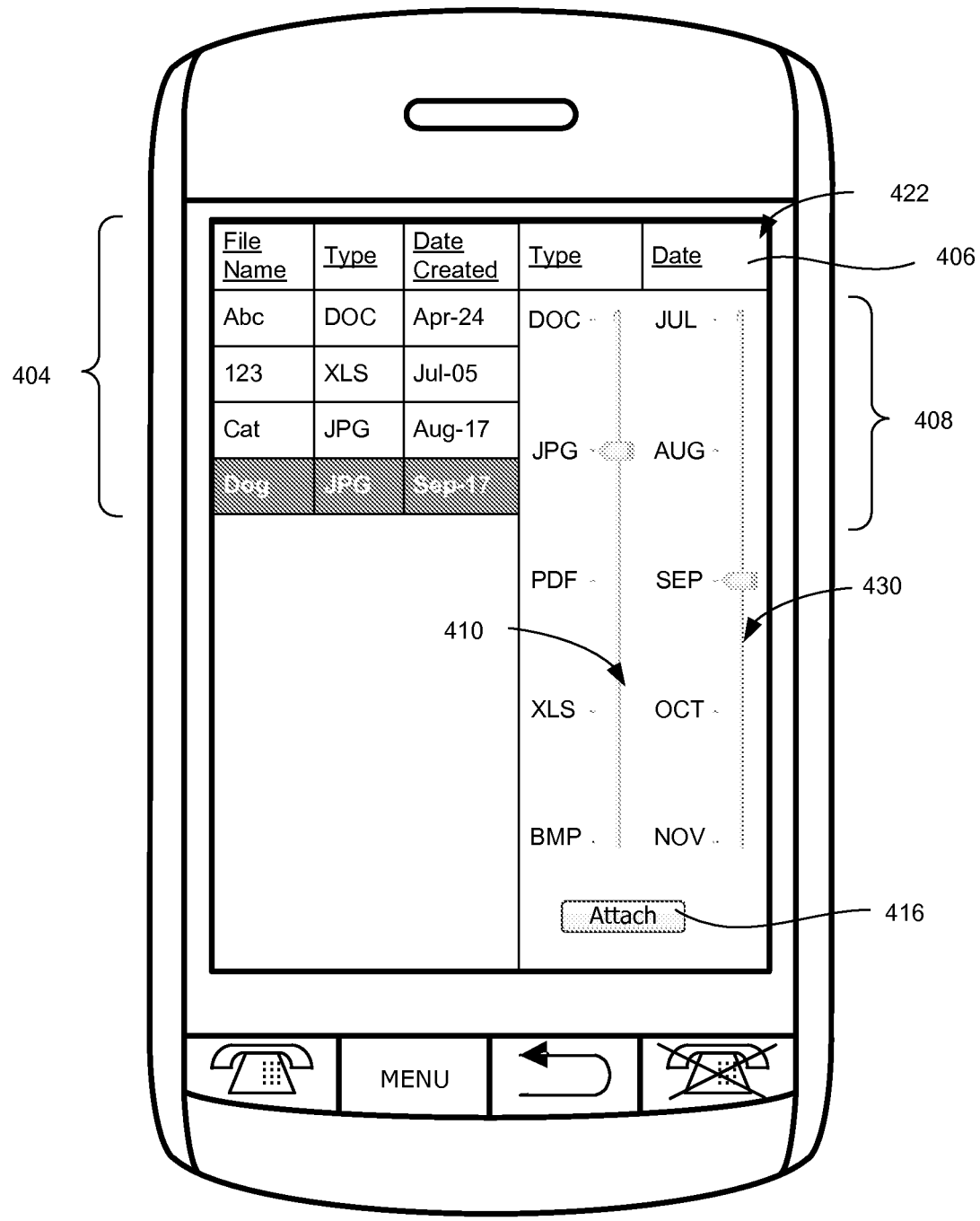
Figure 4C:
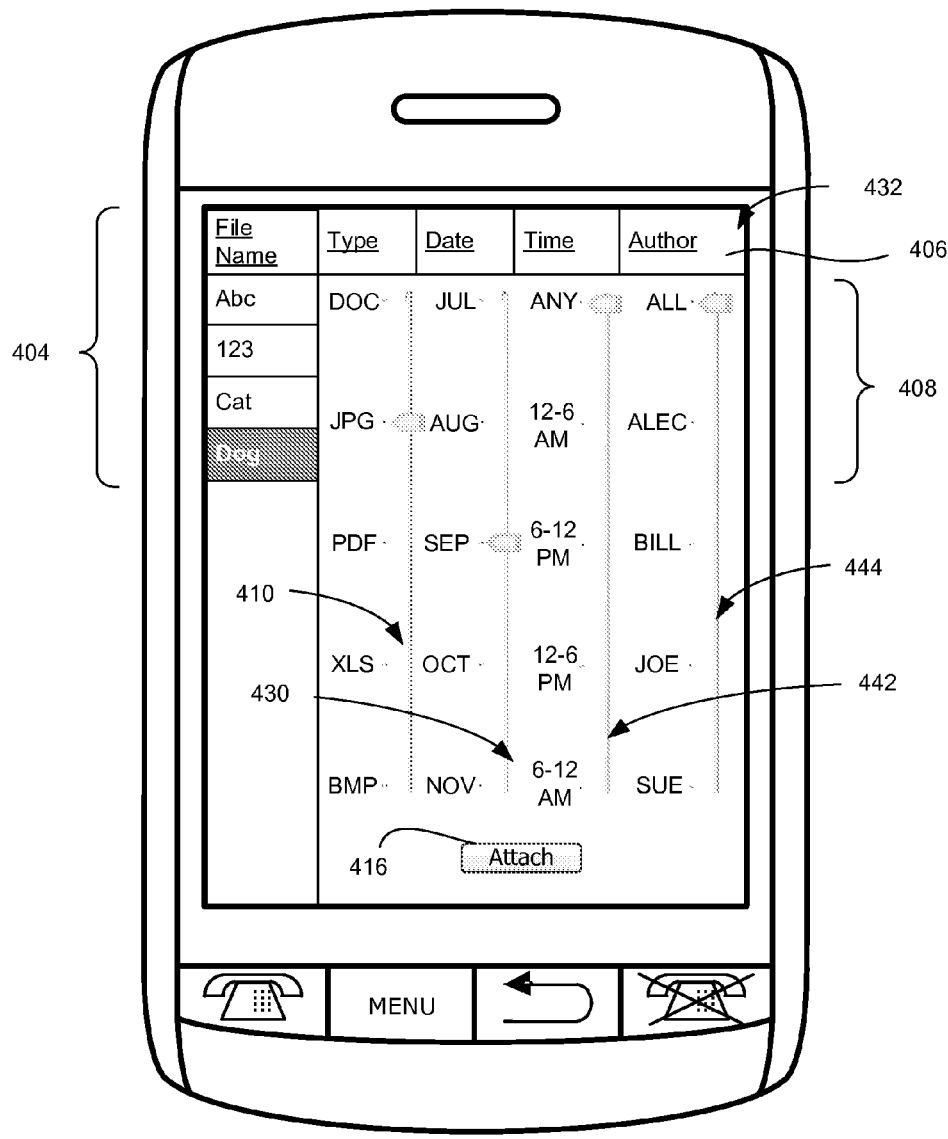

Referring now to FIGS. 4A to 4C, example file selection user interface screens in accordance with examples of the present disclosure will be described. FIG. 4A illustrates a first user interface screen 402 having one slider 410 for defining a single file selection criterion. The slider 410 comprises a file list 404 comprising a number of files 408 and a header 406. The slider 410 includes a reference bar 412 and an indicator 414 which, in the shown embodiment, is depicted as a button or handle. An "Attach" onscreen button 416 for attaching selected files to the email message is also provided in the shown example. In the shown example, the file selection criterion of the slider 410 is file type and four files "ABC", "123", "Cat" and "Dog" are shown in the file list 404. The slider 410 has five positions along the reference bar 412 each corresponding to a different file type: a DOC file such as a Word document file having the file extension ".doc", a JPEG file such as an image file having the file extension ".jpg", a PDF document having the file extension ".pdf", an XLS file such as a Microsoft Excel spreadsheet file having the file extension ".xls", and a bitmap image file having the file extension ".bmp". Other values may be used in other embodiments (e.g., values of "ANY" or "ALL" could be used to select files of any type).

In the shown example, the indicator 414 is located at the position of the JPEG file type to select files which are JPEG files. The files "Cat" and "Dog" are both JPEG files and have been selected. The files "Cat" and "Dog" have been highlighted in the shown example to indicate a file selection status of "selected". The file "ABC" is a DOC file and the file "123" is an XLS file rather than a JPEG file. As a result, these files are not selected and have not been highlighted to indicate a file selection status of "unselected". The file selection status may be shown differently in other embodiments. For example, in other embodiments only selected files are shown in the file list 404 and unselected files are hidden.

In the shown embodiment, file type is based on file format such as DOC files, JPEG files, PDF files and XLS files. In other embodiments, file type may be more general, for example, being based on a category of the file type. In such embodiments, each file format may be assigned to a category. The category assignments may be stored by the portable electronic device 100 for example, in the memory 110. Example categories include, but are not limited to, image files, audio files, video files, electronic messages, notes, calendar items (electronic messages, notes, calendar items may be collectively referred to as PIM items), applications word processing documents, spreadsheet documents and PDF documents.

FIG. 4B illustrates a second user interface screen 422 having two sliders 410 and 430 for defining two file selection criteria. The second slider 430 is used to define a second file selection criterion of the second slider 430, which in the shown example is date. The second slider 430 has values of July, August, September, October and November. The files "ABC", "123", "Cat" and "Dog" in the file list 404 have respective dates of April 24, July 5, August 17 and September 17. The indicator of the second slider 430 is located at the position of the September date to select the files having a September date. The second file selection criterion is applied as well as the first file selection criterion of the first slider 410. As in the first user interface screen 402, the indicator 414 of the first slider is located at the position of the JPEG file type to select files which are JPEG files. The result is that file "Dog" is selected as it is a JPEG file and has a September reference date. The file "Cat" which was formerly selected is now unselected since it has an August reference date. The file "Dog" has been highlighted to indicate a file selection status of "selected". The other files in the file list 404 are not highlighted to indicate a file selection status of "unselected".

Digital pictures are a common type of file which is attached to email messages so the ability to limit the list of files to image files, or a particular type of image file such as JPEG, and apply a further filter to further limit the files, for example by date, may be particularly advantageous in some cases for at least some users.

FIG. 4C illustrates a third user interface screen 432 having four sliders 410, 430, 440 and 442 for defining four file selection criteria. The first and second sliders 410, 430 are the same as in the second user interface screen 422 described above. The third slider 440 is used to define a third file selection criterion of the third slider 440, which in the shown example is time (e.g., time accessed, time modified, time created, time picture taken, etc.). The third slider 440 has values of "ANY", "12 am-6 am", "6 am-12 pm", "12 pm-6 pm" and "6 pm-12 am". Other values may be used in other embodiments. The fourth slider 442 is used to define a fourth file selection criterion of the fourth slider 442, which in the shown example is author. The fourth slider 442 has values of "ALL", "Alec", "Bill", "Joe" and "Sue". Other values may be used in other embodiments. The third and fourth file selection criteria of the third and fourth sliders 440, 442 is applied as well as the first and second file selection criteria of the first and second sliders 410, 430.

In the shown example, the indicator of the third slider 440 is set to "ANY" and the indicator of the fourth slider 442 is located at the position of "ALL" to select files having any time reference and files having all authors. The result is that the file "Dog" is still selected as it is a JPEG file and has a September reference date as the third and fourth file selection criteria of the third and fourth sliders 440, 442 did not eliminate this file. The file "Dog" has been highlighted to indicate a file selection status of "selected". The other files in the file list 404 are not highlighted to indicate a file selection status of "unselected".

The portable electronic device 100 monitors for and detects input setting the position of the indicator of the reference bar of the slider. The input setting the position of the indicator is typically user input received via a user input device of the portable electronic device 100, but could be input from an application 148 such as the application invoking the file selection user interface. In some embodiments, a default position of indicator of the slider may be defined in which case the input setting the position of the indicator is input varying (i.e., moving) the indicator from the default position to a new position. As noted above, the position of the indicator of the slider defines a value for file selection criteria. That is, the position of the indicator of the slider defines file selection criterion or criteria. Each file selection criterion operates as a filter which identifies files for selection. The portable electronic device 100 determines whether input setting the position of the indicator of the reference bar of the slider has been detected (304).

When input setting the position of the indicator of the reference bar of the slider has not been detected, the portable electronic device 100 determines whether input to attach the selected files, or otherwise associate the selected files with the email message, has been detected (310). The portable electronic device 100 monitors for and detects input to attach the selected files such as, for example, selecting of an onscreen button such as the "Attach" onscreen button 416. This input may be any suitable input such as touch input, depression of a designated button or key, depression of the navigation tool, or other suitable input.

When the input to attach the selected files has not been detected, portable electronic device 100 again determines whether input setting the position of the indicator of the reference bar of the slider has been detected (304). When the input to attach the selected files has been detected, the one or more selected files are attached to the email message (312).

When input setting the position of the indicator of the reference bar of the slider has been detected, the portable electronic device 100 identifies files for selection (306) in accordance with the position of the indicator, and the identified files are selected (308). This occurs automatically in response to positioning and re-positioning of the indicator without user input. Files may be identified by applying file selection criterion or criteria to the file parameters of the files stored by the portable electronic device 100. File type may be determined, at least in part, by a comparison of file extensions to a mapping of file extension to file type. Files having file parameters matching the file selection criterion or criteria are identified and selected.

In some embodiments, a threshold may be applied to the total number and/or total size of matching files. In such embodiments, the portable electronic device 100 may request narrower or further file selection criteria from an application 148 or user to reduce the total number and/or total size of matching files. This reduces the amount of data which will be sent as an attachment or selection for other purposes. When the user is providing the file selection criterion or criteria, a prompt may be displayed on the display 112. The method may be suspended until narrower or further file selection criteria which reduce the total number and/or total size of matching files is provided. The threshold may be configurable, for example, by an administrator of the wireless network 150 via IT policy messages sent to the portable electronic device or by the user.

In some embodiments, a threshold may be applied to the size of the file list 404 so that no more than a threshold number of files are displayed in the file list 404. The threshold may be configurable, for example, by an administrator of the wireless network 150 via IT policy messages sent to the portable electronic device or by the user. This threshold may be applied in addition to, or instead of, the threshold applied the total number and/or total size of matching files.

Selecting the files may comprise displaying an indication of the selected files on the display 112, for example, by highlighting or focussing the selected file(s) in the file list 404, marking a checkbox associated with each selected file, or other suitable visual indication. This occurs automatically without user input. Highlighting or focusing a file causes the appearance of the corresponding row(s) in the file list to be changed from a first visual state to a second visual state different from the first visual state. Changing the appearance of a row in the file list, in at least some embodiments, may comprise changing a colour of a background of a row in the file list 404, the text of the row in the file list 404, or both. Unselected files are still displayed in the file list 404 in some embodiments, such as in the examples described above, with each of the selected files being shown using highlighting or other suitable method of visual indication identifying each of the selected files is provided such as a checkbox.

In other embodiments, only selected files are shown in the file list 404 whereas unselected files are hidden and not shown in the file list 404. This is less demanding in terms of graphics processing and so is more efficient in terms of the use of device resources. However, by hiding unselected files the user is not given the opportunity to manually select files which were not selected but the user would nevertheless wish to attach to the email message. In embodiments in which only selected files are shown, the file list 404 is empty when the file selection user interface is first displayed unless a default file selection criterion is defined and applied when the file selection user interface is first displayed. The file list 404 is re-populated with matching files in response to a re-positioning of the indicator.

The files in the file list 404 may be sorted in accordance with one or more of the file selection criterion or criteria applied. For example, the selected files in the file list may be sorted in descending order of the file selection criterion or criteria. The basis for sorting the file list may be configurable. For example, a user may be able to select the file selection criterion or criteria applied in sorting the list and/or whether the sorting in accordance with the file selection criterion or criteria is in an ascending or descending order. For example, if a user selected all picture files taken within the previous 24 hours, the user may be able to select whether the files in the file list 404 are sorted in descending order starting with the most recent picture or ascending order starting with the oldest picture taken in the previous 24 hours.

In some embodiments, the file selection user interface may be configured to receive and accept deselection input so that a user may unselect one or more files from the selected files in the file list 404 by providing corresponding deselection input. This allows the user to manually unselect any files selected in the file list 404 accordance with the file selection criterion or criteria. For example, from a file list 404 having ten select files, the user may unselect two of the files so that only the remaining eight files are selected for attachment to the email message. Additionally, the file selection user interface may be configured to receive and accept additional selection input so that a user may select additional files in the file list 404 that were not automatically selected using the slider. The file selection user interface may provide selection boxes to receive the deselection input and additional selection input in some embodiments. Selection boxes provide convenient and easy to use user interface elements when combined with the slider. Other user interface elements may be provided to receive the deselection input and additional selection input in other embodiments. A selection box or other user interface element may be provided which allows a user to select or unselect all of the files within the file list 403.

As noted above, in some embodiments a default position of indicator of the slider may be defined to automatically select files in accordance with default file selection criterion or criteria. In such embodiments, the slider is invoked and initially displayed with the indicator in the default position and the files matching a default file selection criterion or criteria represented by the default position are automatically selected without input, for example, from a user. As a result of the default file selection criterion or criteria, the file list 404 is initially displayed with the identified and selected files highlighted in the file list in accordance with the default file selection criterion or criteria. The default file selection may occur automatically and without user input, for example, in response to input to add attachments to the email message.

The default position of the indicator of a slider can be repositioned, for example, by a user to change the file selection criterion or criteria. The repositioning of the indicator will cause the files which are selected in the file list 404 to change, resulting in a change in the files which are highlighted in the file list 404. When more than one slider is provided, each slider may have a default position/value and the indicator of each slider may be changed or repositioned to change the respective file selection criterion or criteria. Each slider indicator which is changed will cause the files which are selected in the file list 404 to change, resulting in a change in the files which are highlighted in the file list 404.

The default position or value of the indicator of the slider (e.g., default file type selection criteria) may be set by an application 148 invoking the slider, such as the email messaging application, the operating system 146, or possibly the user. For example, the type of file most frequently selected by the user for attachment to email messages (e.g., picture files), the most common location or source of files selected by the user for attachment to email messages (e.g., removable memory card), may be set as default file type selection criteria. The portable electronic device 100 may maintain file selection statistics and learn the default file type selection criterion or criteria in accordance with the file selection statistics. In such cases, the default file type selection criterion or criteria may change over time.

After selecting files in accordance with the position of the indicator, portable electronic device 100 determines whether input to attach the selected files has been detected (310). This may be, for example, the selecting of an onscreen button such as the "Attach" onscreen button 416. This input may be any suitable input such as touch input, depression of a designated button or key, depression of the navigation tool, or other suitable input. When the input to attach the selected files has been detected, the one or more selected files are attached to the email message (312).

Next, the portable electronic device 100 monitors for and detects input to send the email message to at least one recipient such as, for example, selecting of an onscreen button such as a "Send" button (not shown), and sends the email message to the at least one recipient when the input to send the message is received (314). The input may be any suitable input such as touch input, depression of a designated button or key, depression of the navigation tool, or other suitable input.

While the method of selecting files on a portable electronic device of the present disclosure has been described in the context of attaching documents to electronic messages, the method may be used by an application 148 other than a messaging application in other embodiments and for other purposes in other embodiments.

While the present disclosure is described primarily in terms of methods, the present disclosure is also directed to a portable electronic device configured to perform at least part of the methods. The portable electronic device may be configured using hardware modules, software modules, a combination of hardware and software modules, or any other suitable manner. The present disclosure is also directed to a pre-recorded storage device or computer-readable medium having computer-readable code stored thereon, the computer-readable code being executable by at least one processor of the portable electronic device for performing at least parts of the described methods.

The present disclosure may be embodied in other specific forms without departing from its spirit or essential characteristics. The described embodiments are to be considered in all respects as being only illustrative and not restrictive. The present disclosure intends to cover and embrace all suitable changes in technology. The scope of the present disclosure is, therefore, described by the appended claims rather than by the foregoing description. All changes that come within the meaning and range of equivalency of the claims are intended to be embraced within their scope.

The invention claimed is:

1. A method of selecting one or more files from displayed files on a portable electronic device, comprising:
   displaying a file selection user interface screen on a display of the portable electronic device, the file selection user interface screen comprising a slider comprising a reference bar and an indicator moveable within the reference bar, the position of the indicator within the reference bar defining a value of a file selection criterion;
   automatically selecting all files that comply with the value of the file selection criterion in accordance with a position of the indicator while maintaining display of all the displayed files; and
   attaching the selected files to an electronic message.

2. The method of claim 1, further comprising sending the electronic message to at least one recipient in response to input.

3. The method of claim 1, wherein the indicator is located at a default position when the file selection user interface is initially displayed.

4. The method of claim 1, further comprising:
   detecting input moving the indicator to a new position within the reference bar; and
   automatically selecting all files that comply with a new value of the file selection criterion corresponding to the new position on the reference bar.

5. The method of claim 1, further comprising:
   detecting deselection input identifying one or more previously selected files; and
   deselecting the identified one or more previously selected files in response to the deselection input.

6. The method of claim 1, further comprising:
   detecting selection input identifying one or more previously unselected files; and
   selecting the identified one or more previously unselected files in response to the selection input.

7. The method of claim 1, further comprising displaying selected files in a file list within the file selection user interface.

8. The method of claim 7, further comprising displaying unselected files in the file list with the selected files, wherein a visual indication identifying each of the selected files is provided.

9. The method of claim 8, wherein displaying the visual indication of the selected files comprises highlighting the selected files in the file list, marking a checkbox associated with each of the selected files, or both.

10. The method of claim 1, further comprising:
    detecting input to attach the selected files; and
    attaching the selected files to the electronic message in response to the input to attach the selected files.

11. The method of claim 1, wherein the file selection criterion is defined in accordance with file parameters associated with files stored by the portable electronic device.

12. The method of claim 11, wherein the file parameters associated with files includes one or any combination of file type, date, time and location.

13. The method of claim 1, wherein the file selection user interface screen comprises a plurality of sliders each comprising a respective reference bar and a respective indicator moveable within the reference bar, wherein the position of the indicator within the reference bar defines a value of a respective particular file selection criterion.

14. The method of claim 1, wherein the slider comprises two indicators, a value range of the file selection criterion being defined between the positions of the two indicators, and wherein all files that comply with the value range of the file selection criterion are automatically selected.

15. A portable electronic device, comprising:
    a display for displaying displayed files;
    a processor coupled to the display, the processor configured for:
    causing a file selection user interface screen to be displayed on the display, the file selection user interface screen comprising a slider comprising a reference bar and an indicator moveable within the reference bar, the position of the indicator within the reference bar defining a value of a file selection criterion;
    automatically selecting all files that comply with the value of the file selection criterion in accordance with a position of the indicator while maintaining display of all the displayed files; and
    causing the selected files to be attached to an electronic message.

16. The device of claim 15, wherein the processor is configured for causing the electronic message to be sent to at least one recipient in response to input.

17. The device of claim 15, wherein the indicator is located at a default position when the file selection user interface is initially displayed.

18. The device of claim 15, wherein the processor is configured for detecting input moving the indicator to a new position within the reference bar, and automatically selecting all files that comply with a new value of the file selection criterion in accordance with the new position on the reference bar.

19. The device of claim 15, wherein the processor is configured for detecting deselection input identifying one or more previously selected files, and deselecting the identified one or more previously selected files in response to the deselection input.

20. The device of claim 15, wherein the processor is configured for detecting selection input identifying one or more previously unselected files, and selecting the identified one or more previously unselected files in response to the selection input.

21. The device of claim 15, wherein the processor is configured for causing selected files to be displayed in a file list within the file selection user interface.

22. The device of claim 15, wherein the file selection criterion is defined in accordance with file parameters associated with files stored by the portable electronic device.

23. The device of claim 22, wherein the file parameters associated with files includes one or any combination of file type, date, time and location.

24. The device of claim 23, wherein the file selection user interface screen comprises a plurality of sliders each comprising a respective reference bar and a respective indicator moveable within the reference bar, wherein the position of the indicator within the reference bar defines a value of a respective particular file selection criterion.

25. The device of claim 15, wherein the slider comprises two indicators, a value range of the file selection criterion being defined between the positions of the two indicators, and wherein all files that comply with the value range of the file selection criterion are automatically selected.

* * * * *